(12) United States Patent
The Ngo et al.

(10) Patent No.: US 8,811,039 B2
(45) Date of Patent: Aug. 19, 2014

(54) PULSE WIDTH MODULATED RESONANT POWER CONVERSION

(75) Inventors: Khai Doan The Ngo, Blacksburg, VA (US); Xiao Cao, Itasca, IL (US); Yin Wang, Blacksburg, VA (US)

(73) Assignee: Virginia Tech Intellectual Properties, Inc., Blacksburg, VA (US)

(*) Notice: Subject to any disclaimer, the term of this patent is extended or adjusted under 35 U.S.C. 154(b) by 474 days.

(21) Appl. No.: 13/184,798

(22) Filed: Jul. 18, 2011

(65) Prior Publication Data
US 2012/0014138 A1    Jan. 19, 2012

Related U.S. Application Data

(60) Provisional application No. 61/364,954, filed on Jul. 16, 2010.

(51) Int. Cl.
H02M 3/335    (2006.01)

(52) U.S. Cl.
USPC .......................................... 363/21.02; 363/98

(58) Field of Classification Search
USPC .......................... 363/17, 21.01–21.03, 98, 132
See application file for complete search history.

(56) References Cited

U.S. PATENT DOCUMENTS

| | | | | |
|---|---|---|---|---|
| 6,151,222 A * | 11/2000 | Barrett | | 363/16 |
| 2006/0187686 A1* | 8/2006 | Sun et al. | | 363/17 |
| 2007/0041222 A1* | 2/2007 | Eguchi et al. | | 363/17 |
| 2007/0070655 A1* | 3/2007 | Eguchi et al. | | 363/17 |
| 2008/0055942 A1* | 3/2008 | Tao et al. | | 363/21.03 |
| 2008/0186742 A1* | 8/2008 | Seong | | 363/17 |
| 2009/0303750 A1* | 12/2009 | Zhu et al. | | 363/13 |
| 2010/0142229 A1* | 6/2010 | Chen et al. | | 363/21.02 |
| 2010/0254163 A1* | 10/2010 | Martini et al. | | 363/17 |
| 2011/0090717 A1* | 4/2011 | Lee et al. | | 363/21.02 |

OTHER PUBLICATIONS

A. K. Jain et al.; "PWM Control of Dual Active Bridge: Comprehensive Analysis and Experimental Verification"; Industrial Electronics, 2008, IECON 2008, 34th Annual Conference of IEEE, Nov. 2008, pp. 909-915.
Xuaodong Li et al.; "Analysis and Design of High-Frequency Isolated Dual-Bridge Series Resonant DC/DC Converter"; IEEE Transactions on Power Electronics, vol. 25, No. 4, Apr. 2010, pp. 850-862.

* cited by examiner

*Primary Examiner* — Adolf Berhane
*Assistant Examiner* — Fred E Finch, III
(74) *Attorney, Agent, or Firm* — Whitham, Curtis, Christofferson & Cook, P.C.

(57) ABSTRACT

A power converter including a resonant circuit is controlled by pulse width modulation (PWM) of a switching circuit to control current in the resonant circuit near the frequency of the resonant circuit (a null-immittance criterion) in order to control current and voltage at the output of the resonant circuit. Further control of voltage can be performed by PWM of a switching circuit at the output of the resonant circuit such that centers of the duty cycles of respective switches for the output of the resonant circuit are substantially synchronized and substantially symmetrical about centers of said duty cycles of respective switches at the input of the resonant circuit. Thus, operation of the converter is substantially simplified by using only PWM, a wide range of input and output voltages can be achieved and the converter circuit can be configured for bi-directional power transfer.

17 Claims, 17 Drawing Sheets

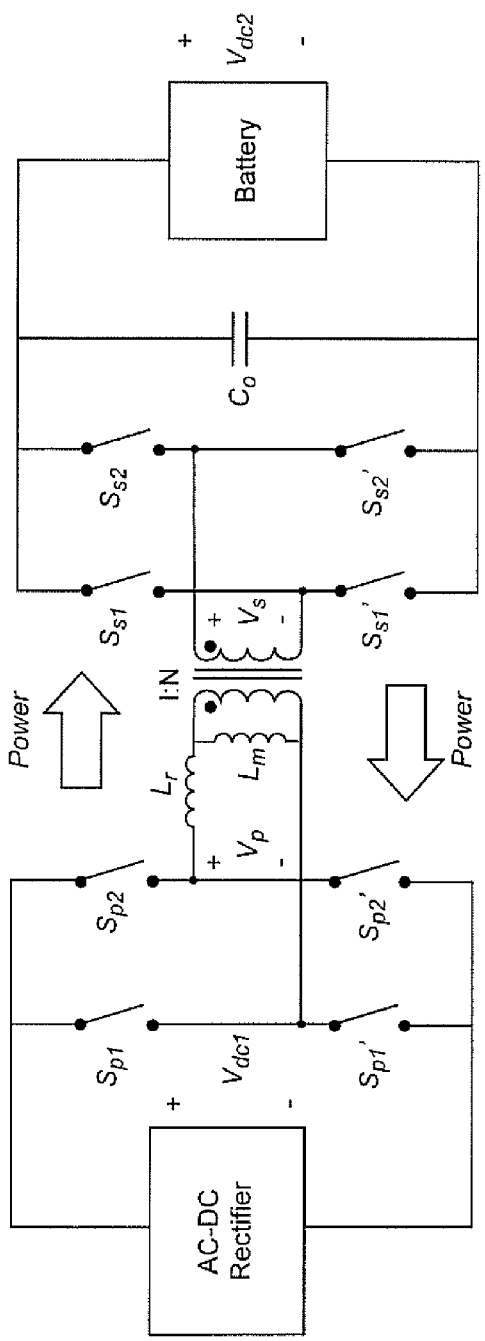
*Figure 2 (Related Art)*
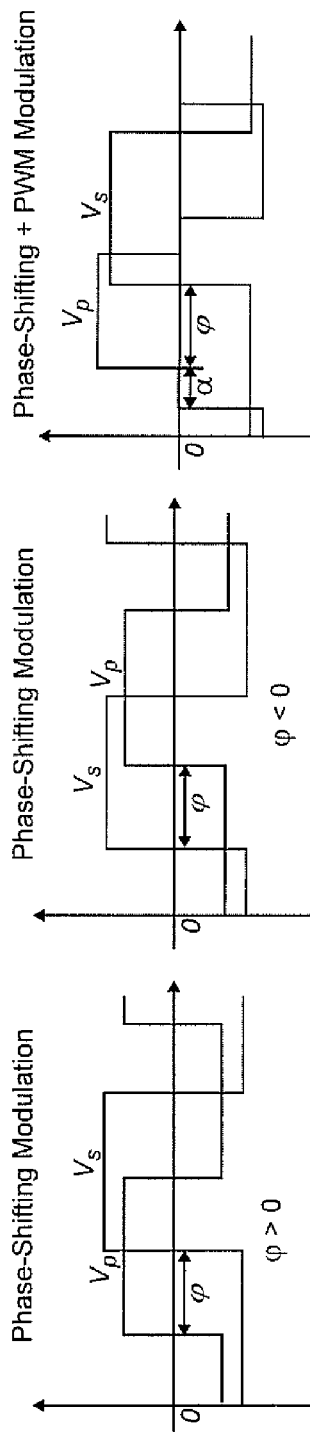
*Figure 3A (Related Art)*
*Figure 3B (Related Art)*
*Figure 3C (Related Art)*

__US 8,811,039 B2__

PULSE WIDTH MODULATED RESONANT POWER CONVERSION

CROSS-REFERENCE TO RELATED APPLICATIONS

This application claims priority of U.S. Provisional Patent Application 61/364,954, filed Jul. 16, 2010, which is hereby incorporated by reference in its entirety.

FIELD OF THE INVENTION

The present invention generally relates to power conversion and power converter circuits such as may be required for charging batteries of electric vehicles or storing power from intermittently available sources such as power derived from renewable resources and, more particularly, to power converters capable of controlling output voltage through pulse width modulation.

BACKGROUND OF THE INVENTION

While alternating current (AC) has long been the standard for distributing power, particularly to loads in fixed locations that may be widely separated from power generation sources where power is continuously generated, there is increasing interest in power systems using so-called renewable resources such as solar and wind power where power generation may be intermittent and generated power, when available, must be stored, often as the potential energy of stored charge, until needed. The same is true for portable or mobile devices which must generally contain their own power sources, such as electrical generators and/or batteries which store energy as charge and deliver that energy as direct current (DC). If alternating current is required by the ultimate load, so-called power inverters can be used to develop AC power from a DC power input. On the other hand, batteries are often not an economical source of portable power unless they are capable of being recharged using energy which is ultimately generated and distributed as alternating current.

Among applications where the powered device is mobile and energy must necessarily be intermittently stored, there has been much recent interest in using electrical power for powering vehicles in order to avoid or at least reduce atmospheric pollution, particularly in areas where numerous vehicles are concurrently in use. Therefore, there has been a corresponding interest in various technologies for batteries which can store greater quantities of energy in order to increase the range of the vehicles as well as the capability of such batteries to be quickly recharged; ideally, within a period time comparable to that required for filling the fuel tank of a vehicle powered by an internal combustion engine. Thus, variable voltage may be necessary for both rapidly charging batteries and to prolong battery life as well as to accommodate various safety concerns encountered in some technologies. Further, isolation of the battery from the power source is generally desirable, particularly for reasons of safety.

In summary, particularly for charging batteries capable of storing relatively large amounts of energy, it is generally desirable to provide an isolated DC-DC converter capable of operating in either buck or boost mode in order to provide an output voltage which is variable over a wide range from a relatively constant input voltage and which is capable of bi-directional power flow. Both buck and boost modes are desirable since input voltage may be higher or lower than the desired output voltage. In the case of battery charging, the output voltage desired depends of the state of battery charge; At he beginning of battery charging the voltage could be very low but near full charge, the voltage is high. Bi-directional power flow capability is desirable since, in addition to transferring power from the grid or a local generator to a battery, the battery may be required to provide energy to the grid or other devices or to another battery.

It is also generally desirable for the DC-DC converter to be controllable to produce a variable output voltage in a simple manner that does not require complex circuitry to produce suitable control waveforms and which has so-called soft switching capabilities (e.g. where switching is performed when voltage and/or current is low or zero) in order to achieve high efficiency. It is also very desirable for high efficiency to be maintained over a wide range of load conditions since the load presented by a battery under charging conditions may be very large when the battery has been deeply discharged but may be much smaller as the battery approaches full charge. In this latter regard, it is also very desirable for the output voltage of the converter to be controllable in a predictable manner; requiring that the controlled output voltage to be substantially unaffected by the load which the battery presents.

Unfortunately, power converter circuits developed prior to the present invention have not been able to achieve all of these desirable features. In particular, known isolated DC-DC converters capable of bi-directional power flow have only been capable of providing soft switching over a very narrow load range and have exhibited load-dependent voltage gain even when complicated control schemes and circuitry are employed.

SUMMARY OF THE INVENTION

It is therefore an object of the present invention to provide a DC-DC power converter capable of supplying a high and variable voltage at high current in a load-independent manner using simplified control.

In order to accomplish this and other objects of the invention, a power converter is provided comprising a first switching circuit having a plurality of switches, a second switching circuit having a plurality of switches, a connection between the first switching circuit and the second switching circuit including a resonant circuit, and a pulse width modulation circuit for providing driving pulses to drive the plurality of switches of at least the first switching circuit at a frequency near a resonant frequency of the resonant circuit.

In accordance with another aspect of the invention, a method of operating a power converter circuit having first and second switching circuits, each switching circuit comprising a plurality of switches connected to provide conversion between AC and DC voltage, and a resonant circuit connecting the first and second switching circuits, the method comprising controlling switches of at least the first switching circuit to provide pulse width modulated current in the resonant circuit at a frequency near a resonant frequency of said resonant circuit.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a schematic diagram of a portion of the system of FIG. 1 including a known Dual active bridge (DAB) converter, FIGS. 3A, 3B and 3C are waveforms used to control amount and direction of power transfer in the DAB converter of FIG. 2.

DETAILED DESCRIPTION OF A PREFERRED EMBODIMENT OF THE INVENTION

Figure 1:
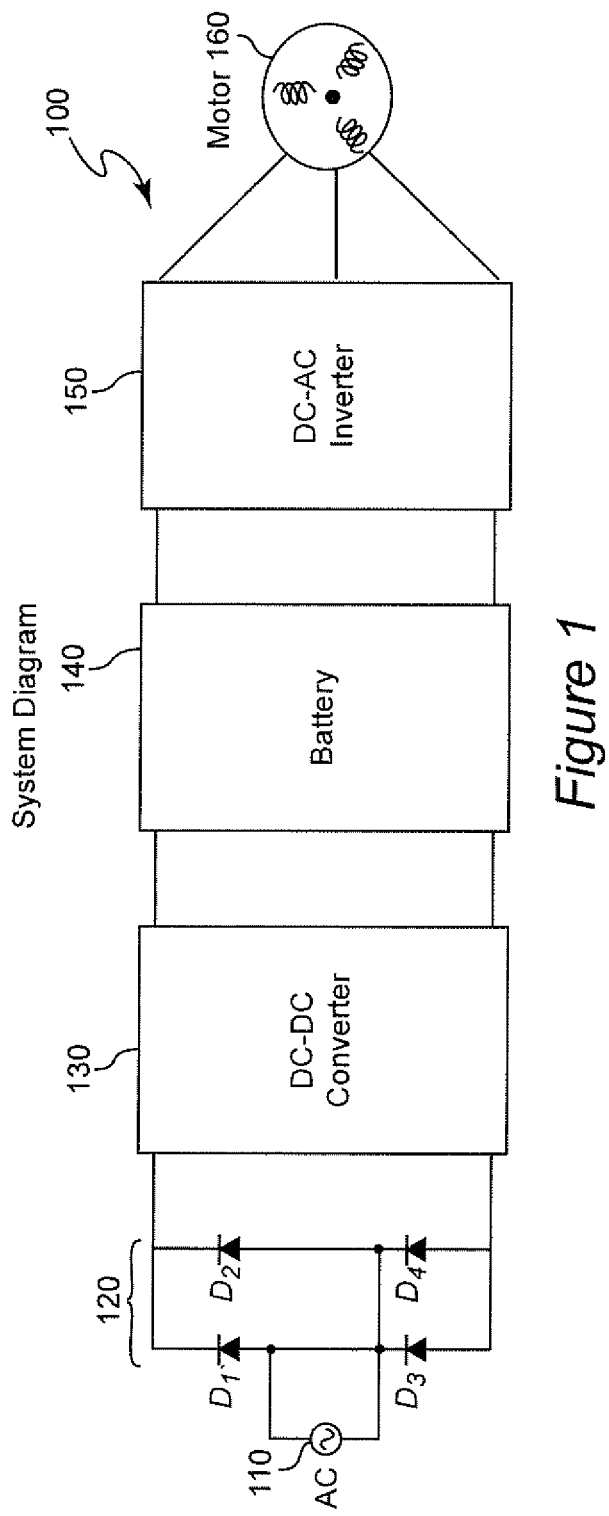
FIG. 1 is a high-level schematic diagram of a system for supplying power to a motor such as may be provided for an electric powered vehicle.

Referring now to the drawings, and more particularly to FIG. 1, there is shown a high-level schematic diagram of the architecture of a power system 100 as might be used for powering a vehicle. In the system architecture illustrated, while unimportant to the principles of the invention, power is delivered from its ultimate source over, for example, distribution system 110 as AC power. The delivered AC power is then transformed into DC power using a rectifier arrangement 120 which is schematically illustrated as a full bridge rectifier using four diodes but the details of the constitution and configuration of the rectifier arrangement are unimportant to the successful practice of the invention. A filter arrangement, such as a filter capacitor, may be included as part of the rectifier arrangement. The DC power so developed will then be applied to a DC-DC converter 130 which can deliver current at a suitable voltage to a battery 140 for storage. Thereafter, the stored power can be applied to a motor 160 or other load as DC power or, if required by the load, AC power developed by inverter 150.

It should also be appreciated that, for some applications, it may be desirable to connect the inverter 150 in parallel with the rectifier arrangement 120 to deliver AC power back to the distribution system 110. It may also be desirable to provide DC power to other DC loads, possibly at different voltages, in addition to delivering power to motor 160. Therefore, it is generally important and often required that DC-DC converter 130 be not only operable as a buck converter (e.g. to reduce voltage) or a boost converter (e.g. to increase voltage) and provide for bi-directional power flow as alluded to above. It is also desirable for the DC-DC converter to be a switching converter operable at a fixed frequency and to be easily controllable using a fixed amplitude signal but having another parameter that is continuously variable (or incrementally variable with relatively fine increments) that can be developed by simple circuitry such as control by, for example, pulse width modulation (PWM).

An example of a known DC-DC converter capable of at least these functions is illustrated schematically in FIG. 2. The circuit principally comprises a transformer connected between two full-bridge (sometimes called H-bridge) switching circuits capable of reversing the direction of current flow in the transformer windings or reversing the polarity of voltage appearing across the transformer windings by closing switches in two opposite legs of the full bridge (e.g. Sp1 and Sp2' or Ss1 and Ss2') while the other switches (e.g. Sp2 and Sp1' or Ss2 and Ss1') are opened and vice-versa and is thus commonly referred to as a dual active bridge (DAB) topology. The Inductors Lr and Lm illustrated may be parasitic inductance of the transformer (e.g. leakage inductance and magnetizing inductance) or may be added inductances to adjust waveforms such that so-called soft switching may be achieved by performing the switching when voltage on and/or current through the switches is near zero. It is immaterial to operation of this circuit whether the inductances are on the primary side or secondary side or distributed between the primary and secondary sides of the transformer. Thus, the circuit of FIG. 1 functions as if it were entirely symmetrical and, as such, can provide desirable bi-directional power flow. The transformer also serves to provide isolation between the respective sides of the circuit which is highly desirable, as also alluded to above.

In operation, as is known, the direction and magnitude of power transfer through the circuit is given by the equation:

$$P = NV_{dc1}V_{dc2}\phi(1-\phi/\pi)/2\pi f_s L_r \quad (1)$$

(Where N is the turns ratio of the transformer and $\phi$ is the phase difference in switch control timing between the primary and secondary sides of the circuit) for the general case of simple phase-shift modulation of the switching on the primary and secondary sides of the circuit. Switch control waveforms for phase shift modulation are shown in FIGS. 3A and 3B.

A detailed discussion of the operation of the operation of circuits of DAB topology is provided in "PWM Control of Dual Active Bridge: Comprehensive Analysis and Experimental Verification" by Jain et al., IEEE Transactions on Power Electronics, Vol. 26, No. 4, April 2011, pp. 1215-1227, which is hereby incorporated by reference in its entirety and includes analysis of a more general switching control technique that includes a combination of phase shift modulation and pulse width modulation (PWM). Pulse width modulation can be achieved simply by phase shifting the switching control signals in one leg of either or both of the primary and secondary sides of the circuit by a phase angle, $\alpha$, with respect to the other. Exemplary switching control waveforms showing an exemplary relationship of $\alpha$ and $\phi$ is illustrated in FIG.

3C. The direction and magnitude of power transfer when both phase shift modulation and PWM are employed is given by $$P=(8/\pi^2)\cos(\alpha/2)\sin(\alpha+(\phi/2))(NV_{dc2}V_{dc1}^2)/ 2\pi f_{sw}V_{dc1}Lr \quad (2)$$

As can be readily understood (and detailed in the above-incorporated Jain et al. publication), when both phase shift modulation and PWM are used together, particularly on both the primary and secondary sides of a DAB topology circuit, the equations for expressing power transfer become extremely complicated. However, in qualitative terms, because of the leakage inductance (which may be set, for example, by an air gap in a leg of the transformer core or similar structure and which can be supplemented, if desired or needed, with additional series inductance), the voltage of the primary side of the circuit can be controlled by the phase modulation of switches on the primary side of the transformer. The same type of modulation can be employed on the secondary side of the transformer to control the secondary side voltage and the power transferred is controlled by the phase shift between voltages at the primary side and the secondary side of the circuit. Thus, use of phase shift modulation and PWM may require a complicated control scheme to achieve voltage control since voltage gain is affected by both switching frequency and load and, perhaps more importantly, the asymmetric phase shifting of switch control. Moreover, soft switching can only be achieved over a very narrow load range and cannot be achieved at light loads because the circulating currents are not high enough to discharge the parasitic capacitors of the switches. Low circulating current leads to a small ZVS range which means high switching losses but low conduction loss and switching losses then predominate and limit overall efficiency.

Figure 4:
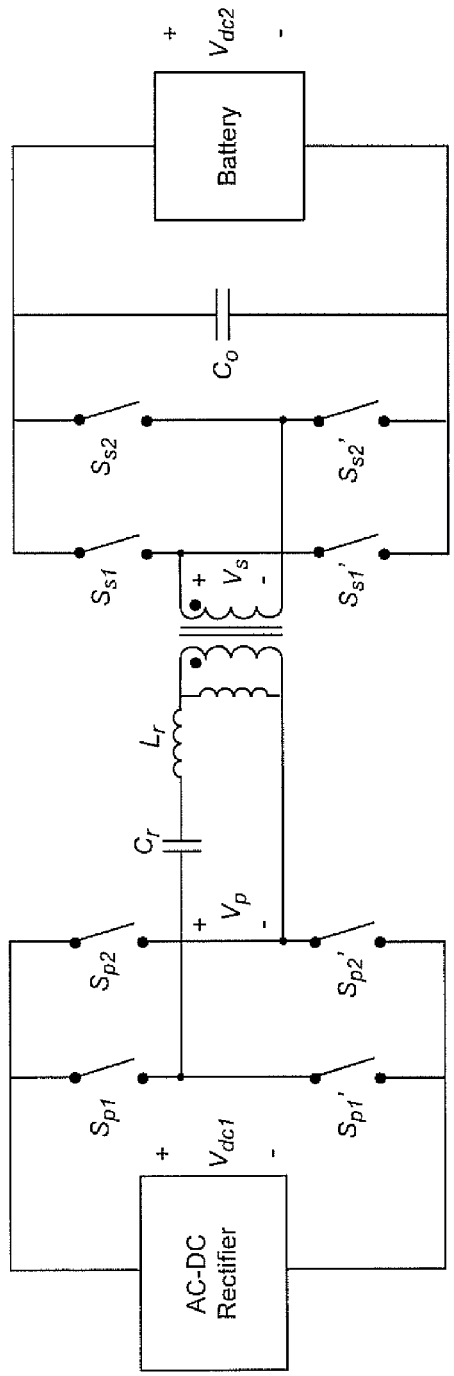
FIG. 4 is a schematic diagram of a known series resonant DAB converter.
Figure 5:
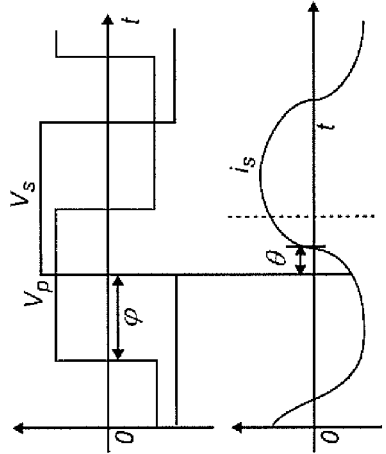
FIG. 5 illustrates waveforms corresponding to operation of the series resonant DAB converter of FIG. 4.

In an effort to reduce large circulating currents and increase the load range over which soft switching can be achieved, a circuit topology illustrated in FIG. 4 has been proposed and is discussed in detail in "Analysis and Design of High-Frequency Isolated Dual-Bridge Series Resonant Converter" by Li et al., IEEE Transactions on Power electronics, Vol. 25, No. 4, April 2010, which is also hereby incorporated by reference in its entirety. The topology of this circuit is identical to that of FIG. 2 but for the inclusion of a capacitor, Cr, having a value that is resonant with the inductance, Lr. As discussed therein, only phase modulation (but not PWM) is employed for controlling the switches in the bridge circuits on the primary and secondary sides of the circuit. Large circulating currents are not caused since there is no PWM (e.g. α=0) applied. Exemplary operational waveforms are shown in FIG. 5 in which the angle θ is the phase difference between the resonant tank current and the output voltage and determines whether the secondary side switches can achieve ZVS. As will be discussed more fully below, ZVS can be achieved for the secondary side switches only if θ<0. However, while soft-switching can be achieved over an extended range in the topology of FIG. 4, the voltage gain remains affected by both load and frequency, variable switching frequency and a complicated control scheme are required since voltage gain is affected by phase shifting as well as load and switching frequency. As with the circuit topology of FIG. 2, the relative phase of switching on the primary and secondary sides of the circuit controls both the direction and magnitude of power transfer and the voltage gain is similarly affected by both load and switching frequency.

Figure 6:
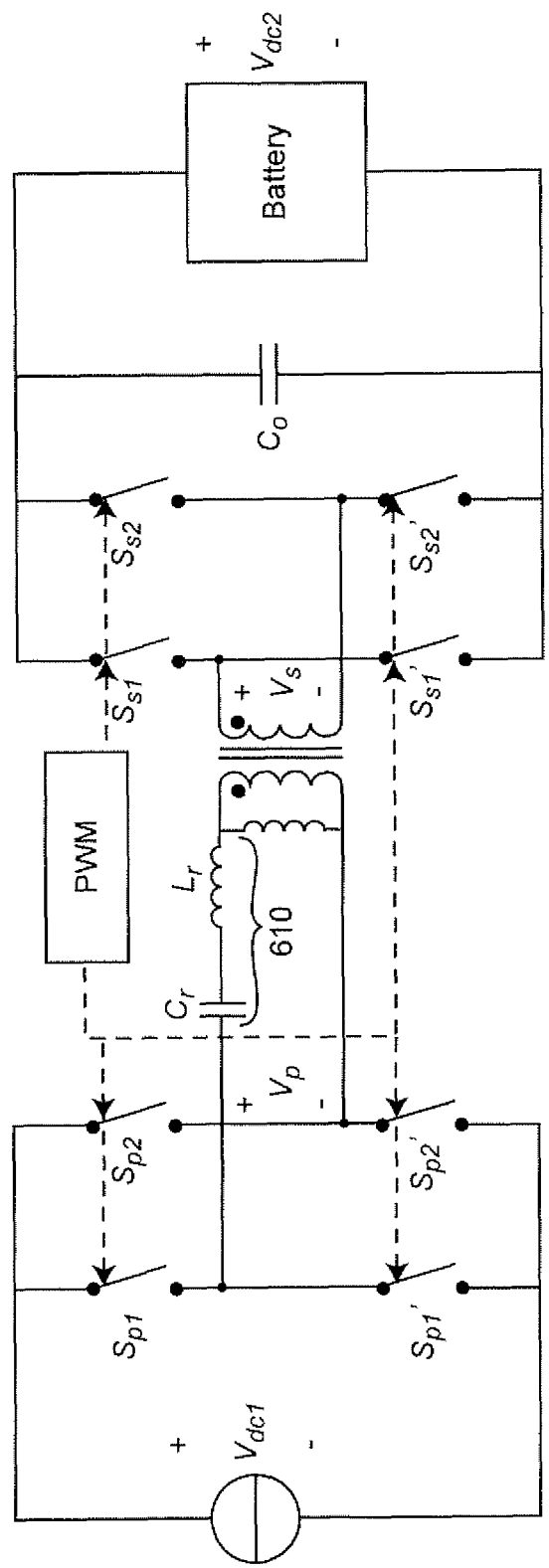
FIG. 6 is a schematic diagram of a series resonant DAB converter in accordance with the invention.

The inventors have discovered, however, that numerous simplifications of control and operation as well as increased functionality and improved performance can be achieved by operating a circuit similar to that of FIG. 4 at substantially the resonant frequency using PWM only as illustrated in FIG. 6. Exemplary operational waveforms are illustrated in FIG. 7. FIGS. 6A-6D illustrate an exemplary circuit and operational waveforms thereof for generating the operational waveforms of FIG. 7. That is, the inventors have discovered that the phase shift modulation between the primary and secondary sides of the circuit which cause asymmetry of the switching control signals and require complicated circuitry can be omitted entirely since the phase shifts that can be achieved by PWM on the primary and secondary sides of the circuit are sufficient to control the voltage gain and power transfer direction and do so in a much less complicated manner.

Moreover, the inventors have discovered that PWM which is symmetrical and synchronized on both the primary and secondary sides of the circuit allows voltage gain to be independent of load. Further, the inventors have discovered that adequate control of voltage gain using PWM can be achieved at a constant frequency which, if set close to (e.g. at or slightly above) the resonant frequency, can unconditionally provide soft switching to guarantee high efficiency under any load condition. Additionally, using symmetrical and synchronized PWM switch control signals, allows the circuit of FIG. 6 to be operated in either a buck or boost mode; allowing the output voltage to be continuously varied over a very wide range while retaining bi-directional power transfer capabilities.

Specifically, symmetrical and synchronized PWM is preferably achieved in accordance with the invention by applying a threshold to a triangular waveform using a circuit such as that of FIGS. 6A and 6B which will be discussed is greater detail below. As the threshold is increased or decreased, the points in time when a triangular waveform pulse crosses the threshold will approach or separate from each other symmetrically around the maximum or peak of the triangular waveform pulse, defining the switching points for a three-level waveform. The phase angle between the maximum of the triangular wave and the trailing edge of the primary or secondary side voltage waveform are shown as α and β, respectively, as illustrated in FIG. 7.

Figure 6A:
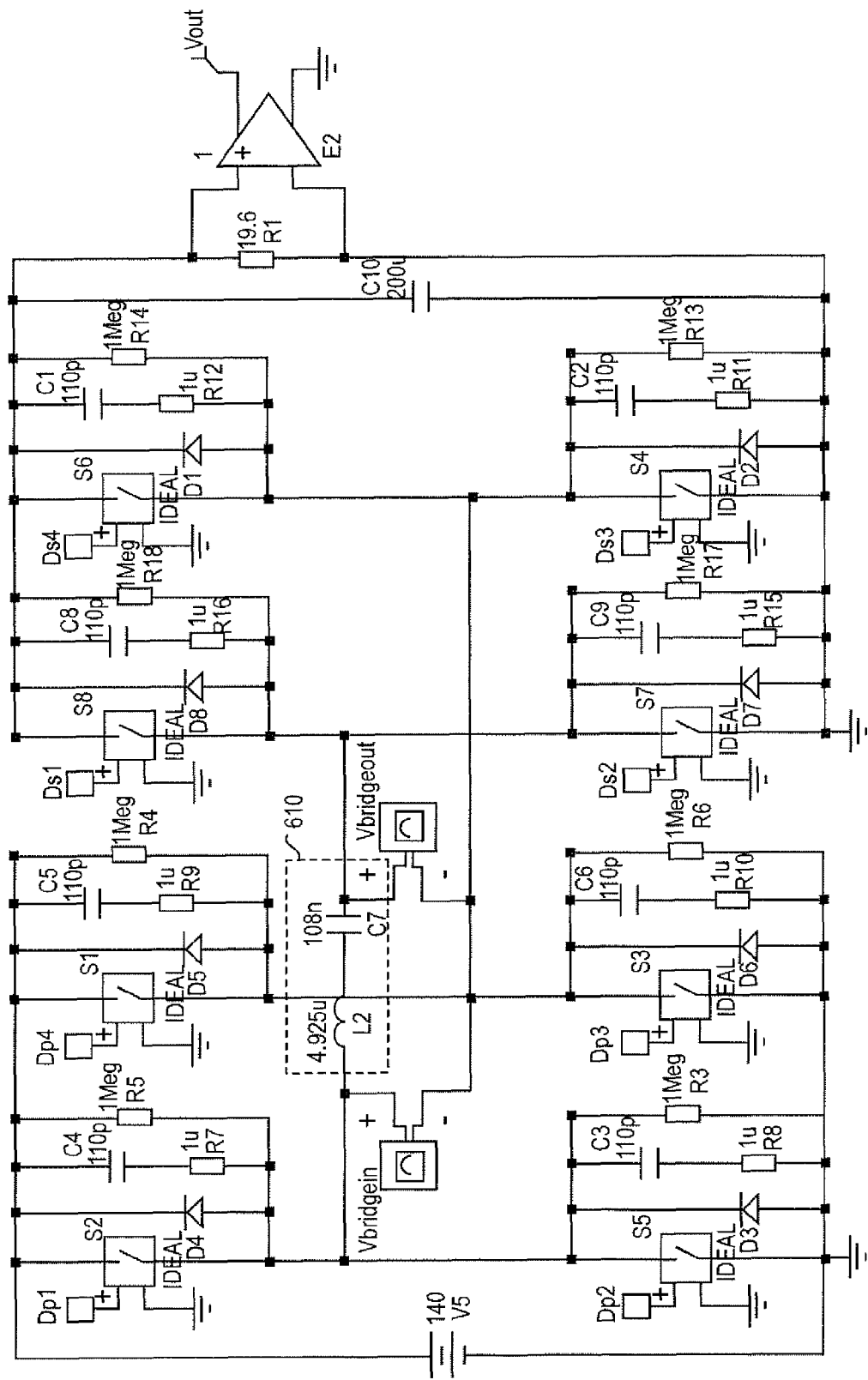
FIG. 6A is a schematic diagram of a preferred main circuit for producing symmetrical, synchronized PWM waveforms in accordance with the invention.
Figure 7:
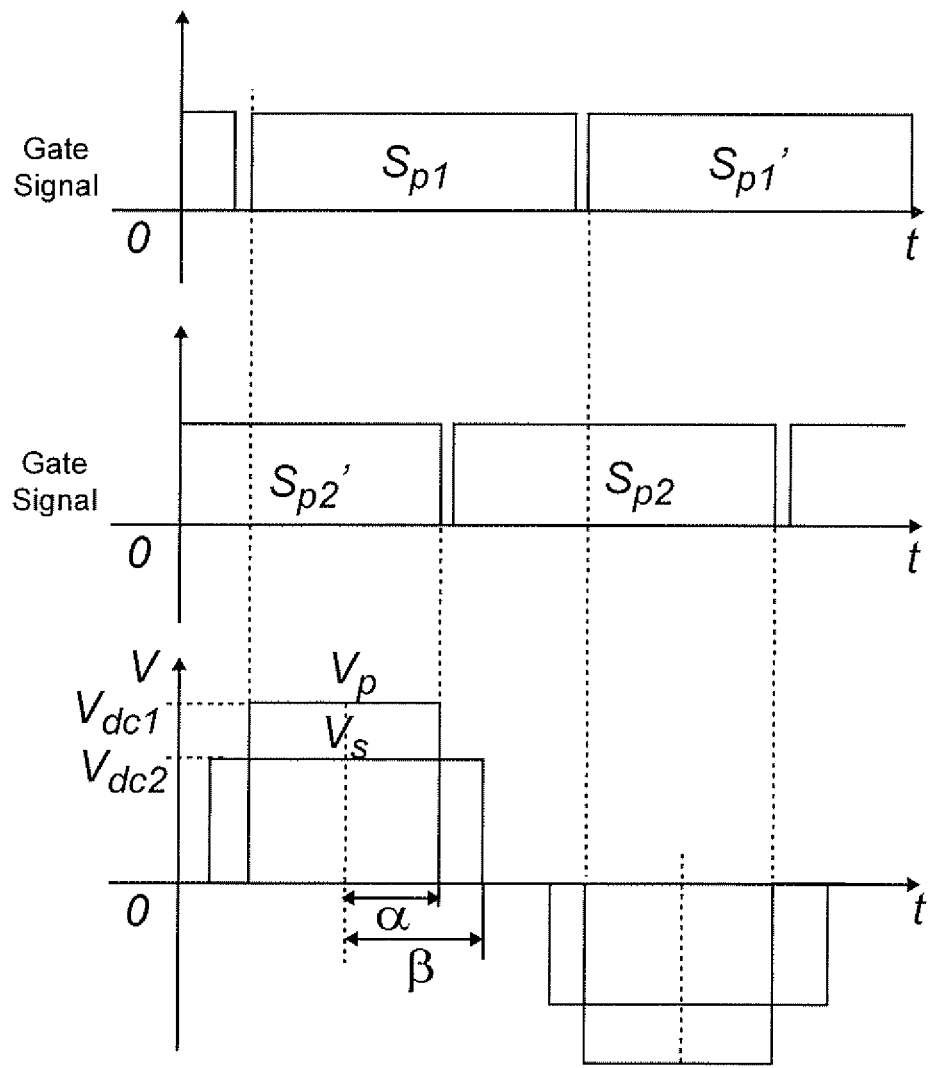
FIG. 7 illustrates waveforms for the operation of the series resonant DAB converter in accordance with the invention.

The circuit shown in FIG. 6A is the simulation file (and thus contains an output circuit and "test points" (Vbridgin and Vbridgout) that may be regarded as artifacts of simulation which are unnecessary for successful practice of the invention) that shows the power stage of the PWM converter. The switches shown in FIG. 6A are illustrated as ideal switches and the parasitic capacitors and resistors and body diodes of the switches shown in FIG. 6 are shown for purposes of simulation and different reference numerals are applied for that reason. C10 of FIG. 6A corresponds to the output capacitor $C_o$ of FIG. 6 and the load of FIG. 6 is represented in FIG. 6A by R1. The tank circuit 610 comprising $R_1$ and $C_L$ of FIG. 6 are represented by L2 and C7 within dashed line 610' in FIG. 6A.

Figure 6B:
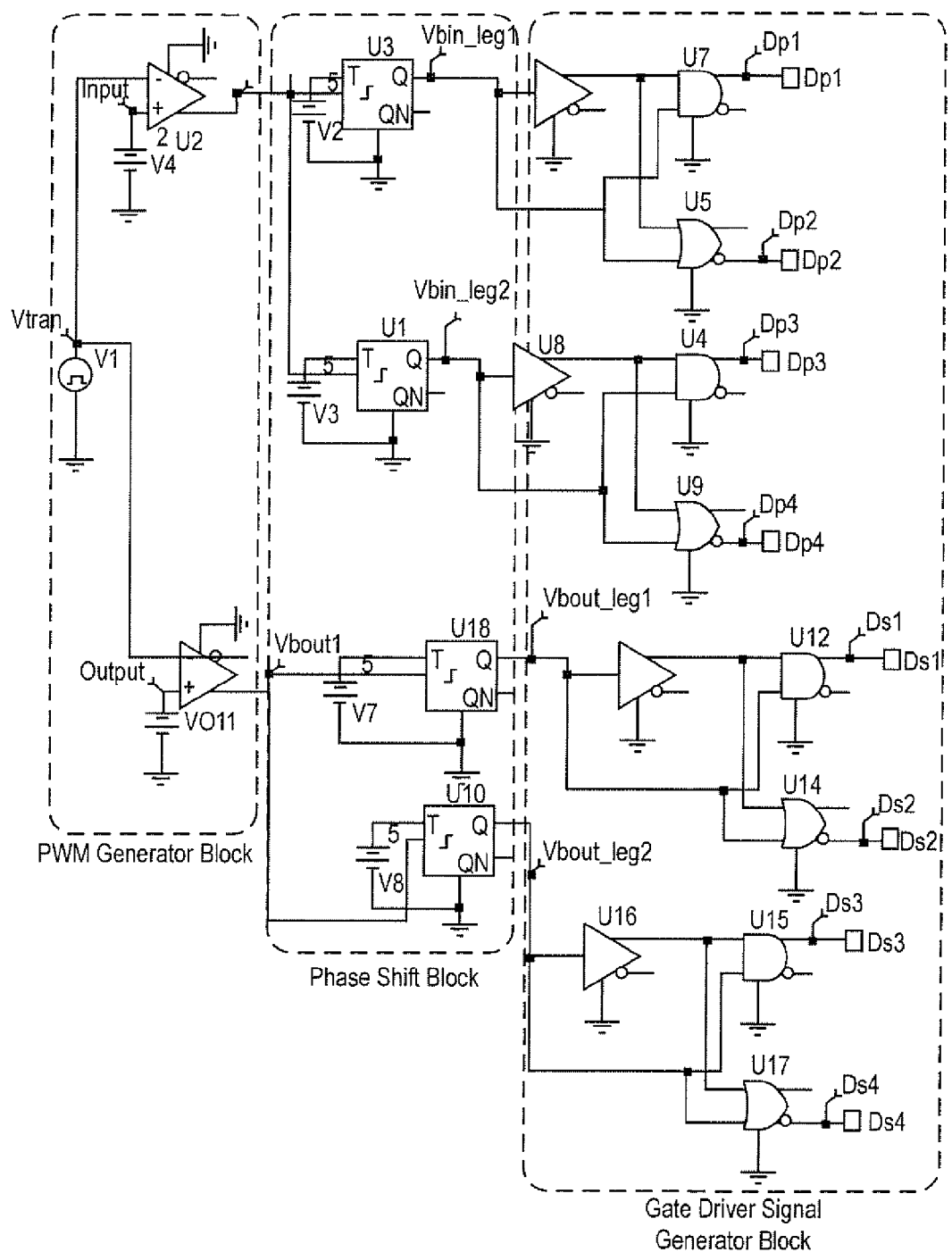
FIG. 6B is a schematic diagram of a preferred main circuit for producing symmetrical, synchronized PWM waveforms in accordance with the invention.
Figure 6C:
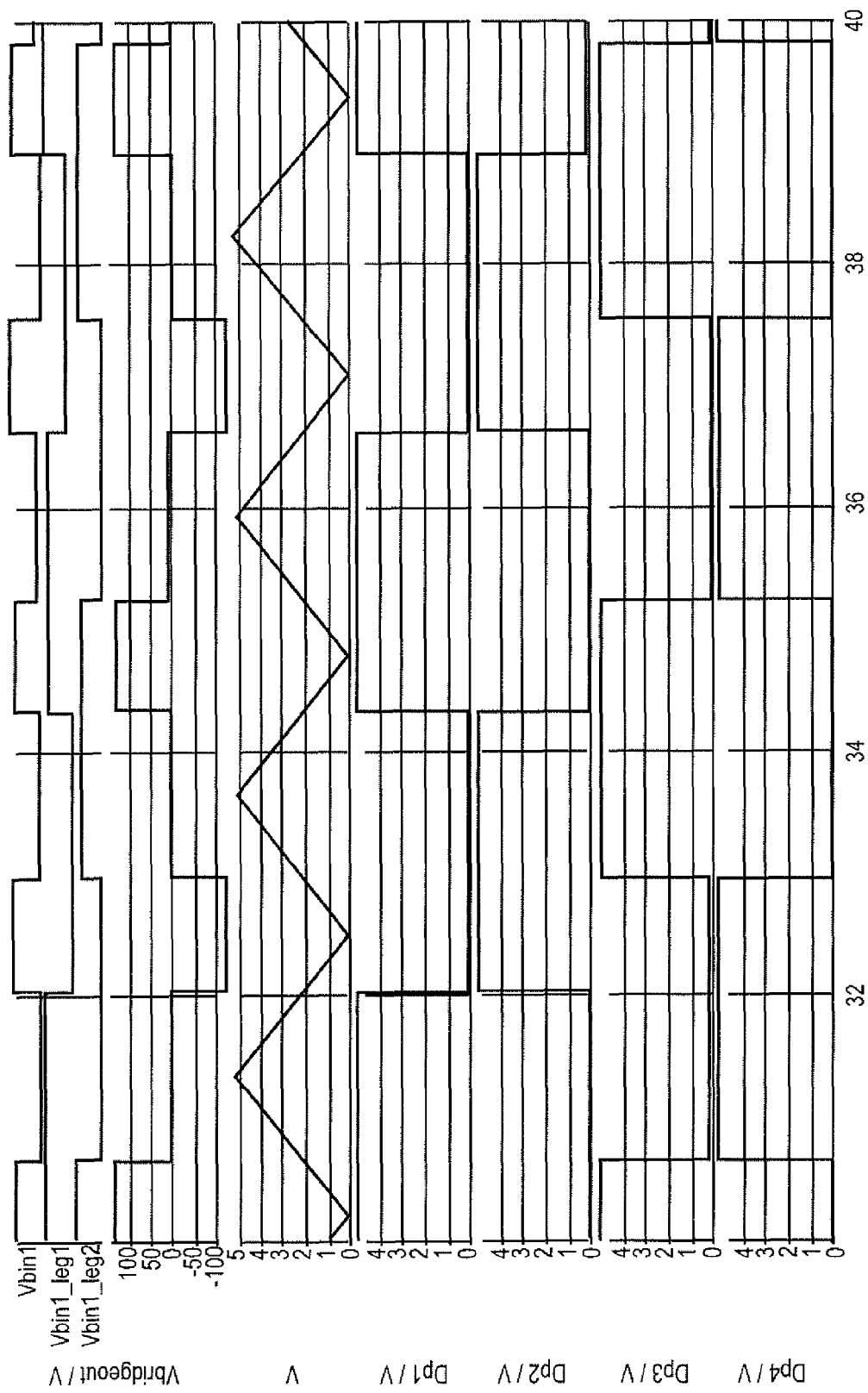
FIGS. 6C and 6D illustrate operational waveforms, generated by the circuits of FIGS. 6A and 6B for the input and output bridges of a converter circuit in accordance with the invention.
Figure 6D:
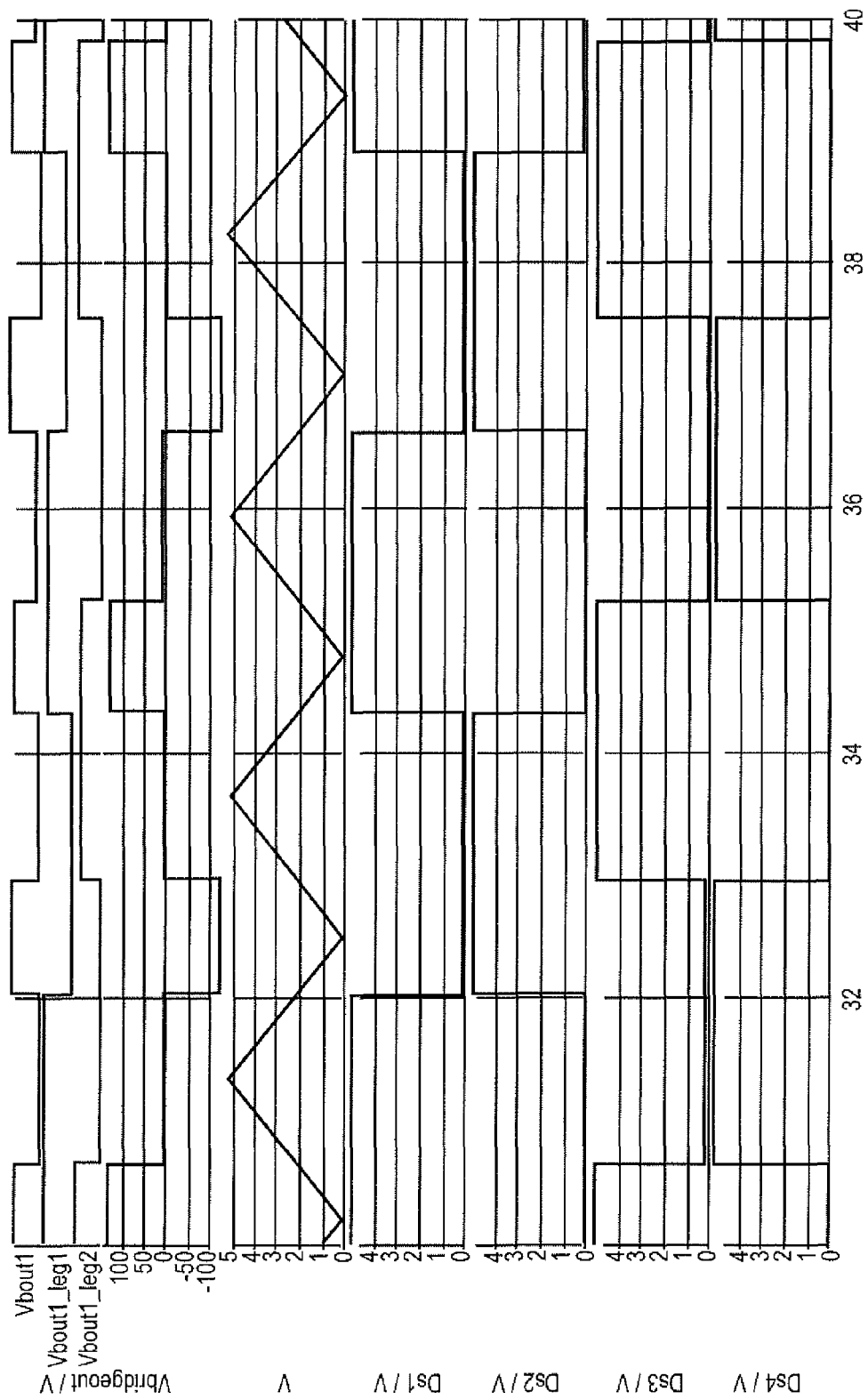

Referring now to FIG. 6B, when the PWM waveforms are generated from a triangular waveform $V_{tran}$ as discussed above, two pairs of T-flip-flops, triggered by the rising and falling edges as shown in the phase shift block portion of FIG. 6B, separately follow the PWM waveforms to achieve the gate driver signals for the switch bridges on the primary and secondary sides of the converter circuit. In the gate driver signal generator block of FIG. 6B, buffers, and an array of AND and OR gates are used to generate the complementary gate driver signals with dead time for each phase leg. Alternatively the buffers illustrated can also be replaced by RC circuits to generate the desired dead time. The operational waveforms of FIGS. 6A and 6B are shown in FIGS. 6C and 6D for the primary and secondary side switch bridges. The eight outputs of the gate driver signal generator block are then applied to the respective switches of the primary and secondary bridge circuits of FIG. 6A Referring again to FIG. 7, the resulting voltages on the primary and secondary sides of the circuit will thus be square waves, the Fourier transform of which can be expressed as:

$$v_p(t) = \sum_{n=1}^{\infty} \frac{4V_{dc1}}{\pi n} \sin\left(\frac{\pi n}{2}\right)\sin(\alpha n)\sin(nt) \quad (3)$$

$$v_s(t) = \sum_{n=1}^{\infty} \frac{4V_{dc2}}{\pi n} \sin\left(\frac{\pi n}{2}\right)\sin(\beta n)\sin(nt) \quad (4)$$

In general, it is considered preferable to choose values of Cr and Lr to have a series resonant frequency to match a desired switching frequency for the converter. For a switching frequency at or slightly above the resonant frequency, the impedance of the resonant tank circuit formed by Cr and Lr can be considered to be zero. As a result, the voltage across the LrCr tank circuit at the fundamental frequency is forced to zero.

This condition is referred to by the inventors and hereinafter as a null-immittance criterion since, if switching is performed at a resonant frequency of a resonant circuit such that the fundamental frequency of voltage across the resonant circuit is forced to zero, the resonant circuit will emulate a short circuit and both the voltages and currents at the input and output ports of the resonant circuit are forced to be equal, thereby achieving direct voltage and current conversion. This criterion can thus be exploited in regard to any resonant circuit and any switching topology at the input and output ports of the resonant circuit and therefore many variant embodiments of the invention are possible and can function for conversion of any combination of AC and DC input and output voltages and currents. Switching is only necessary to achieve PWM (although setting of switching frequency is also simultaneously achieved) so that voltage variation can be achieved by regulation of the current in the inductor and consequent voltage developed across it which serves to transfer power through the converter circuit. If a DC voltage output is required, any type of rectifier circuit can be employed and bridge-type switching circuits should be understood as merely exemplary of types of circuits that can operate bi-directionally to convert between DC and AC. Notably, as will be discussed below in connection with FIG. 13, a particularly simple embodiment of the invention capable of operating as a variable voltage converter capable of operating in accordance with the invention as discussed herein need not include either a transformer or control of switching on the secondary side of the converter circuit (e.g. diodes can be used).

Thus, from equations (3) and (4) and considering the fundamental frequency components of the voltages to be equal, the following simple equation can be derived:

$$V_{dc2}/V_{dc1} = \sin(\alpha)/N\sin(\beta) \quad (5)$$

Thus equation (5) shows that the ratio of primary and secondary side voltages is equal to the inverse of the ratio of the ratio of the duty cycles of the primary and secondary side switches (e.g. $2\alpha$ and $2\beta$ for N=1) and thus the output voltage is independent of load while operation at a constant, resonant frequency avoids dependency of output voltage on switching frequency. Further, the circuit will operate in a buck mode when $\alpha<\beta$ and will operate in a boost mode when $\alpha>\beta$; shifting seamlessly from one mode to the other as their relative values change. The efficacy of the invention to provide operation in either a buck or boost mode has been confirmed by simulation and will now be discussed with reference to FIGS. 8-12.

In general, it is desirable to keep the pulse width of either $2\alpha$ or $2\beta$ as large as possible. Therefore, to increase voltage from a minimum value to a maximum value, it is preferable to start with the duty cycle of Vs=$2\beta$ at 50% and to increase Vp=$2\alpha$ from a minimal value to 50% where converter voltage gain will be one and thereafter to further increase voltage gain by decreasing $2\beta$ to a minimal value while maintaining the duty cycle of Vp=$2\alpha$ at 50%. However, it should be observed and kept in mind during the following discussion of FIGS. 8-12 that a given converter voltage gain can be obtained using a continuum of duty cycles for $\alpha$ and $\beta$. For example, as long as $\alpha=\beta$ the converter voltage gain will be one (or N or 1/N if N≠1) regardless of the duty cycle of Vp and Vs.

Figure 8:
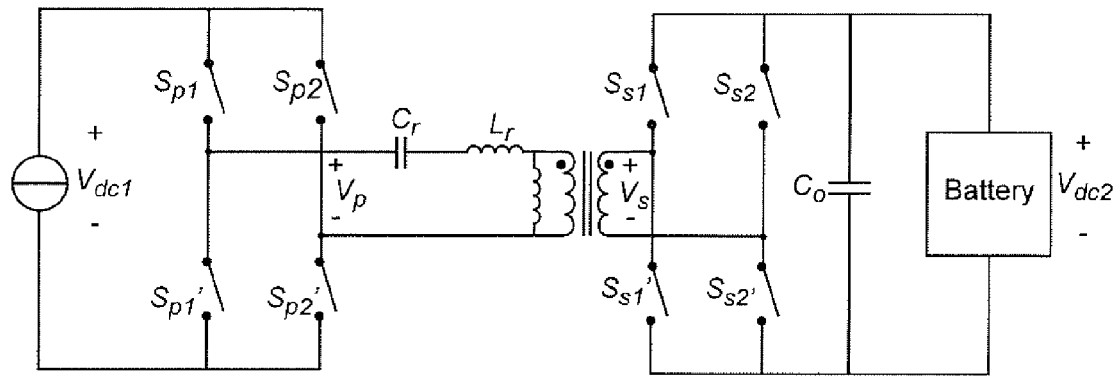
FIGS. 8 and 9 illustrates simulation waveform varying secondary side pulse width modulation (PWM) in accordance with the invention and resulting output voltage and current waveforms.
Figure 8:
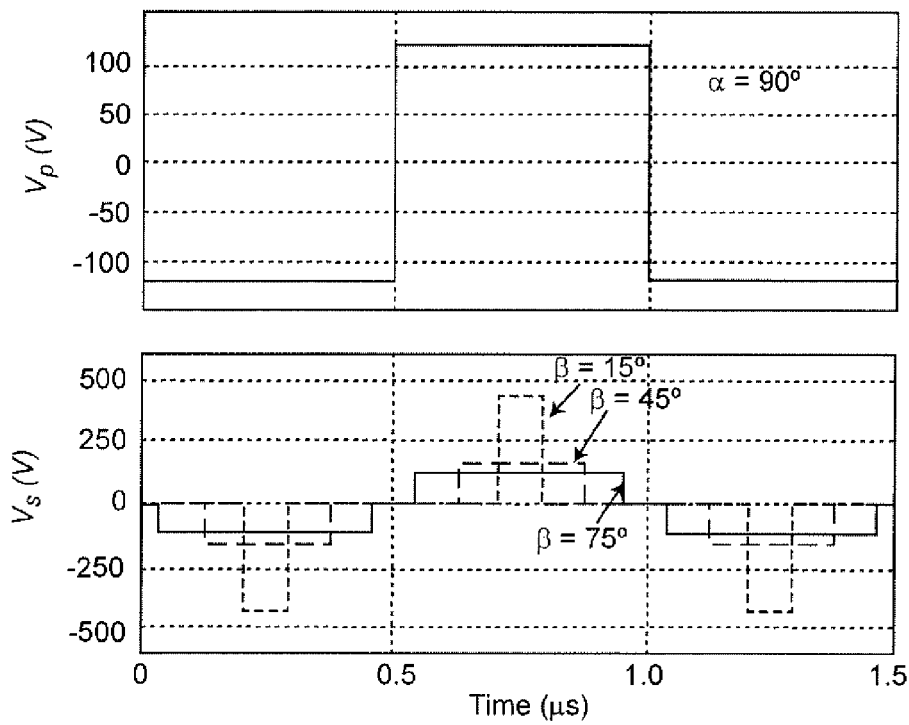

As shown in FIG. 8, the primary side voltage waveform (Vp) duty cycle is set to 50% ($\alpha=180°/2=90°$; the dead time appearing at both the leading and trailing edges of the PWM pulse) and $\beta$ is used as the control variable. Exemplary values for $\beta$ of 15°, 45° and 75° are shown for the secondary side voltage, Vs. The other simulation conditions were:

$V_{dc1}$=120 Volts
fs=1.0 MHZ
$f_0$=0.998 MHZ (resonant frequency)
Power=13 kW (full load)
N=1.

Figure 9:
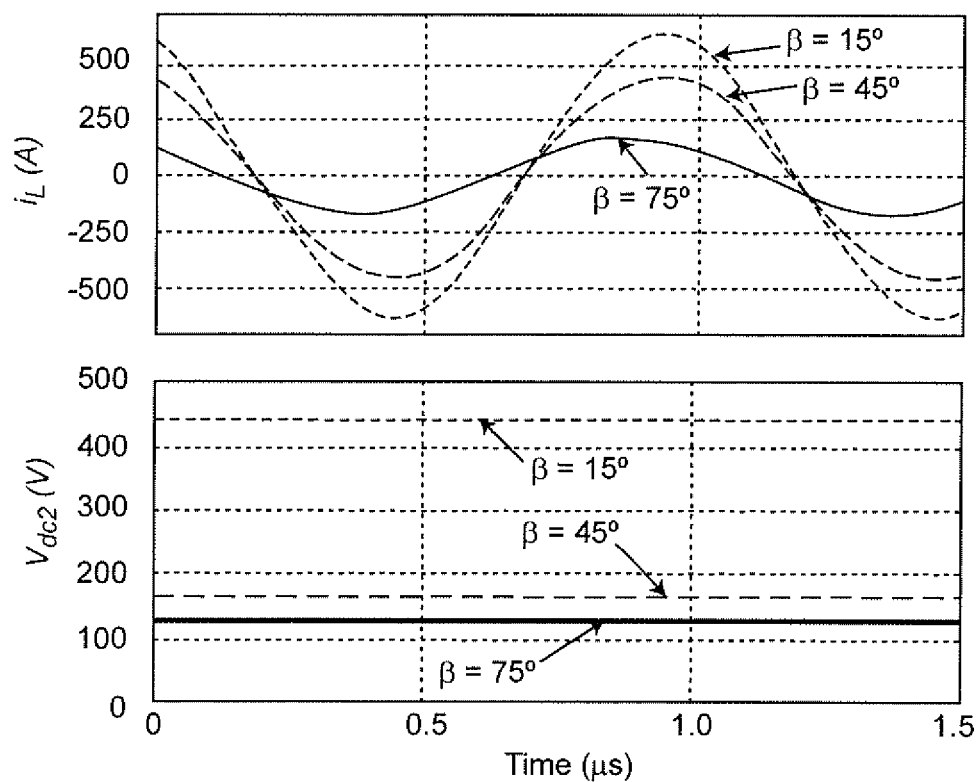

The resulting inductor current $i_L$ and secondary side output voltage, $V_{dc2}$, are shown in FIG. 9. Recalling that the difference in voltages at the primary and secondary side windings of the transformer appears as a voltage across the inductor as a function of the current therethrough and the switching is performed at substantially the resonant frequency of the converter, the inductor current is substantially a sinusoidal waveform having a peak voltage that substantially follows (but lags behind in phase) the peak secondary winding voltage. The filtered output voltage, $V_{dc2}$, is substantially proportional to the peak inductor current. Thus, it is seen that the synchronized symmetrical switching of the converter circuit in accordance with the invention is clearly capable of operating in a boost mode with the output voltage increasing with decreasing $\beta$. It should be noted that buck mode operation is not exhibited in FIGS. 8 and 9 since $\beta<\alpha$ for the simulations illustrated. These results are fully consistent with the expected function of the invention as described above.

Figure 10:
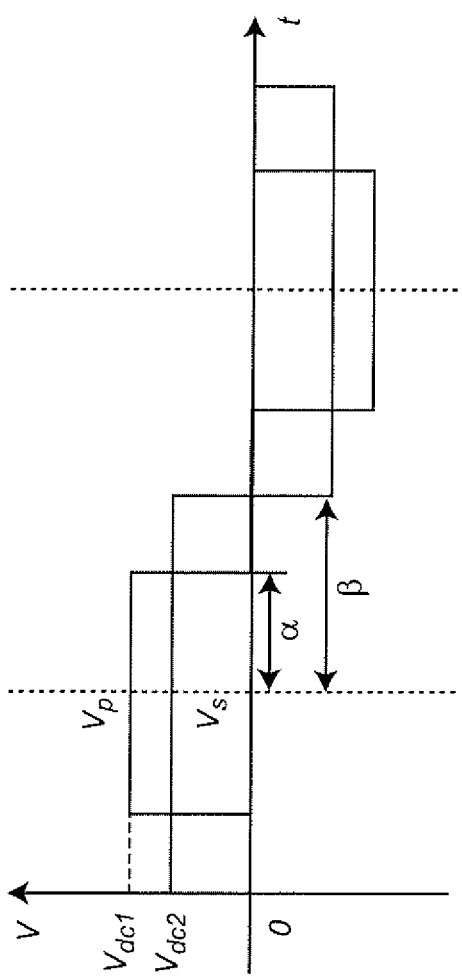
FIG. 10 illustrates waveforms for operation of the converter in accordance with the invention as a buck converter.

Referring now to FIG. 10, the converse simulation switching waveforms are depicted. That is, $\beta$ is set to 90° and a is varied as the control variable. In this case, the simulated response is entirely consistent with equation (5) above and the proportionality of the output voltage to the input voltage is equal to $\sin(\alpha)/\sin(\beta)$. Since $\beta=90°$, $\sin(\beta)=1$ and thus $V_{dc2}$ equals $V_{dc1} \sin(\alpha)$; corresponding to buck mode operation.

Figure 11:
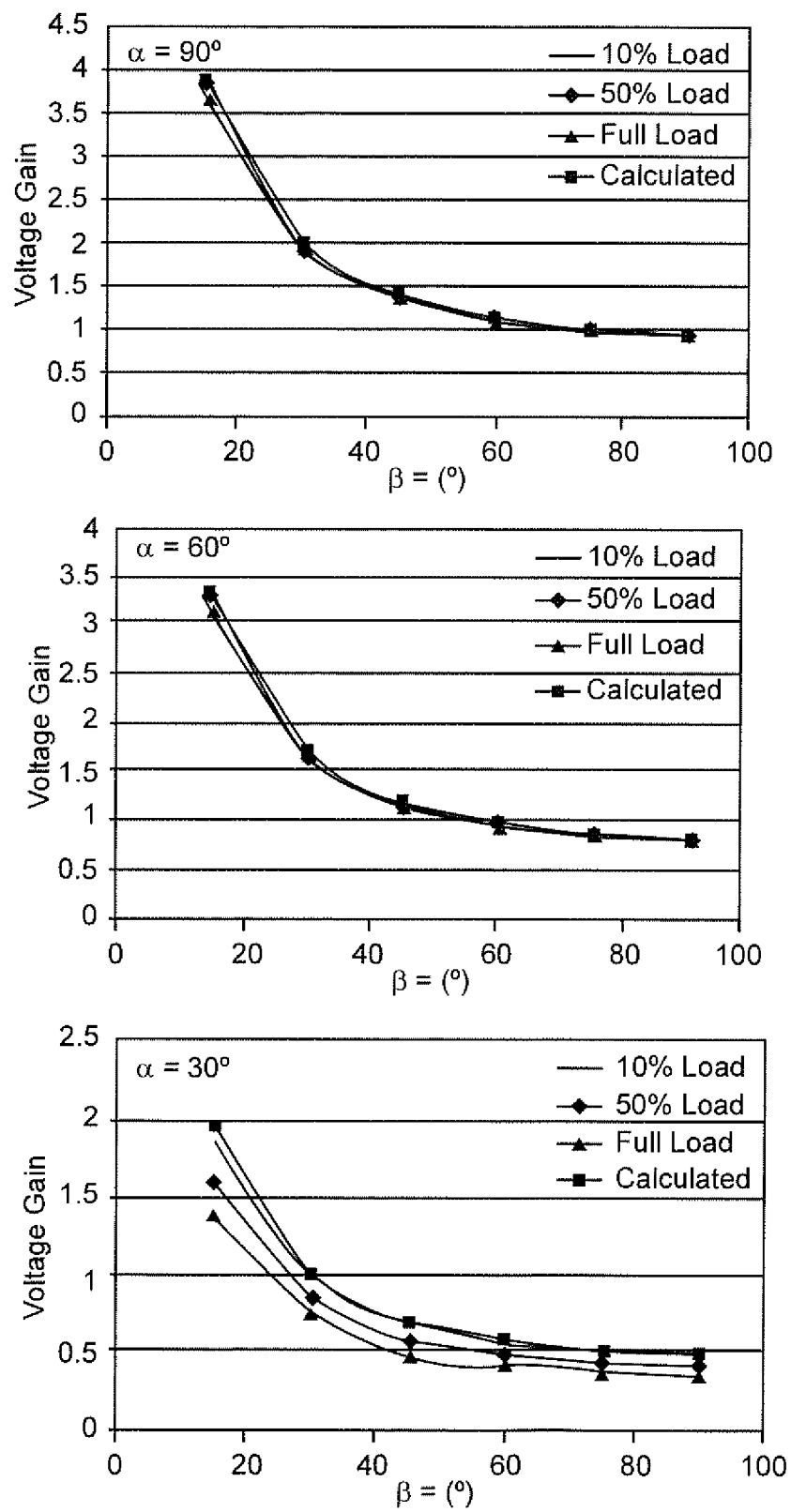
FIG. 11 graphically summarizes the operation of the invention as a boost or buck converter and verifies the theoretical or calculated performance of a converter in accordance with the invention.

The simulation results discussed above are summarized in FIG. 11 from which several other observations can be made confirming the predicted performance of the invention. Specifically FIG. 11 illustrates three families of curves showing voltage gain as a function of $\beta$ for three different values of $\alpha$, respectively. The respective curves of each family of curves indicate voltage gain (e.g. the ratio of output voltage to input voltage) for different loads and include the calculated, theoretical voltage gain as discussed above.

First of all, it should be noted that all curves are in good agreement with the calculated voltage gain, thus indicating that the invention is capable of producing the predicted results that the inventors have theorized and evidently confirming the theory of operation of the invention as discussed above. Second, the curves of each family of curves are substantially congruent and overlaid, thus indicating that the voltage gain is substantially unaffected by load, as predicted. (The simulation includes consideration of the voltage drop across the switches as shown in FIG. 6A, accounting for the very slight differences in voltage gain with load at short duty cycles.) Third, it should be noted that all three families of curves are of substantially the same shape but are differently scaled and that unity voltage gain is achieved when β=α, thus further confirming the proportionality indicated in equation (5). Fourth, by appropriate choice of α and β, voltage gain can be varied at will over a range extending from about 0.5 to nearly 4.0, an 0:1 ratio for a given transformer turns ratio, even without using extremely small but feasible values of either α or β. In general, as alluded to above, use of extremely small values of α or β are not desirable or entirely practical since the equations of proportionality of input and output voltage discussed above assume ideal conditions (e.g. no losses). With losses included, the gain will not go to infinity as equation (5) implies and large gains should be accomplished, as a matter of design, by choice of transformer turns ratio. Finally, it should be noted that there is no anomalous behavior of the voltage gain at unity gain where the circuit changes operational mode between buck converter operation and boost converter operation in accordance with the above discussion of controlling converter voltage gain with α and β. Unity voltage gain will be obtained when α=β=90° and, if α is decreased, the converter will be operating in the buck mode or, if β is decreased the converter will be operating in the boost mode even though the basic electrical operation of the converter is unchanged in either buck or boost mode; only the gain is changed.

Figure 12:
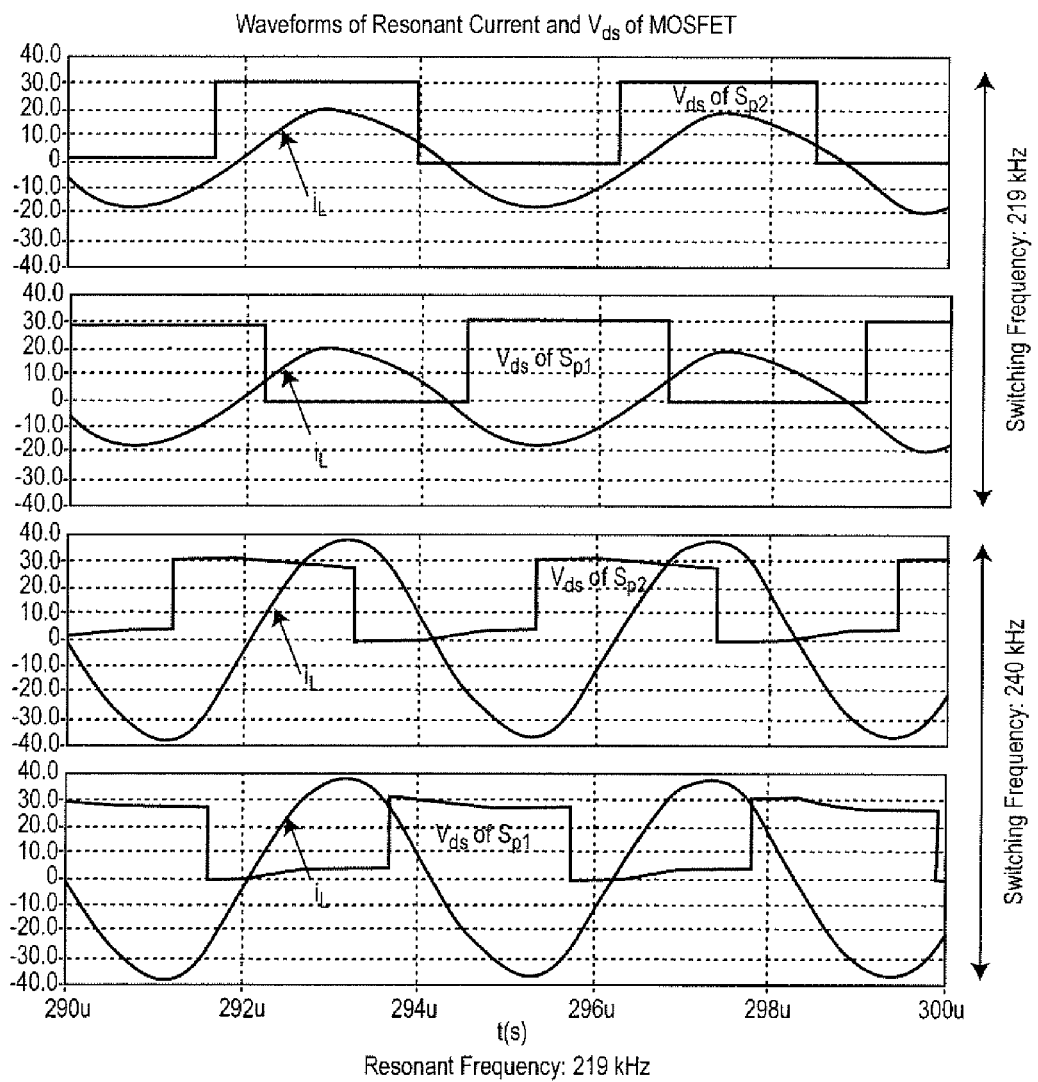
FIG. 12 illustrates waveforms for achieving zero voltage switching in the operation of the invention to reduce switching losses.
Figure 13:
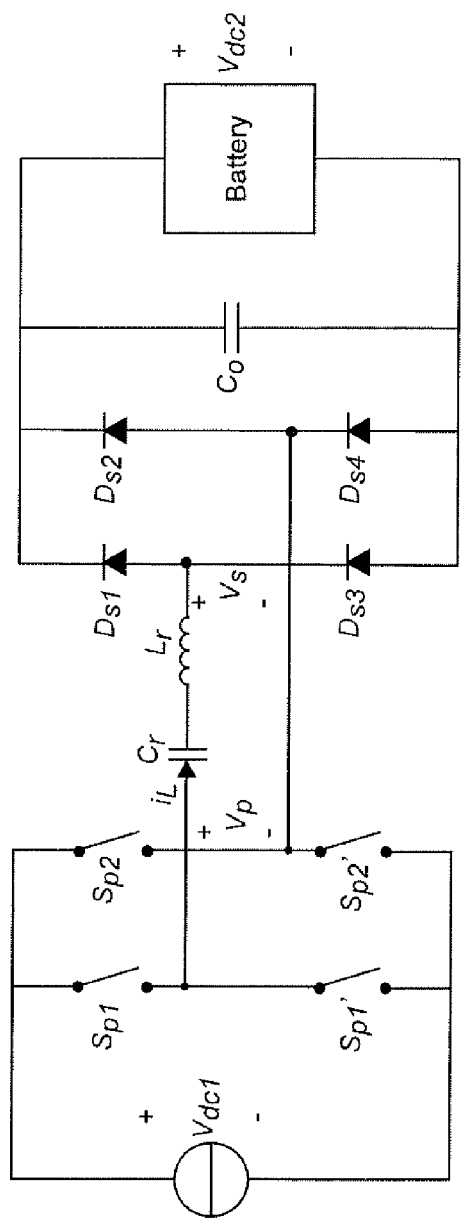
FIGS. 13, 14, 15 and 16 are schematic diagrams of further embodiments illustrating application of the principle of the invention to exemplary power converter variations and topologies.

Referring now to FIGS. 12 and 13, conditions for achieving zero voltage switching (ZVS) to reduce switching losses will now be discussed. FIG. 12 comprises a separate graph of inductor current and the drain-to-source voltage, $V_{ds}$, of switches Sp1 and Sp2 for two different switching frequencies at and above the resonant frequency of 219 KHz for this particular simulation of the operation of the circuit of FIG. 13. As alluded to above, FIG. 13 is a simplified converter circuit in which the transformer is omitted and the secondary switches are replaced by diodes which need not be controlled but which, like the converter circuit of FIG. 6, allows the null-immittance criterion to be utilized and its meritorious effects obtained.

It should be understood that the controlled switches on the input side of the circuit are not ideal switches but are field effect transistors (FETs, preferably MOSFETs) that have an anti-parallel connected body diode therein, as shown in FIG. 6A discussed above. For ZVS, the direction of $i_L$ should be such that the body diode conducts before the MOSFET is turned on so that the conduction of the body diode brings the voltage across the MOSFET to near zero. This condition requires $i_L$ to be negative before turn on of $S_{p1}$ and $S_{p1}'$ and positive before turn on of $S_{p2}$ and $S_{p1}'$. Thus, it is easier for lagging switches $S_{p2}$ and $S_{p2}'$ to achieve ZVS. In both the resonant frequency and the above-resonant frequency examples for which waveforms are illustrated in FIG. 12, $S_{p2}$ and $S_{p2}'$ have ZVS but $S_{p1}$ and $S_{p1}'$ have ZVS only when operated slightly above the resonant frequency. However, it is clear that ZVS can be achieved while still meeting the null-immittance criterion and the switching frequency can be readily tuned around the resonant frequency to achieve ZVS.

Figure 17:
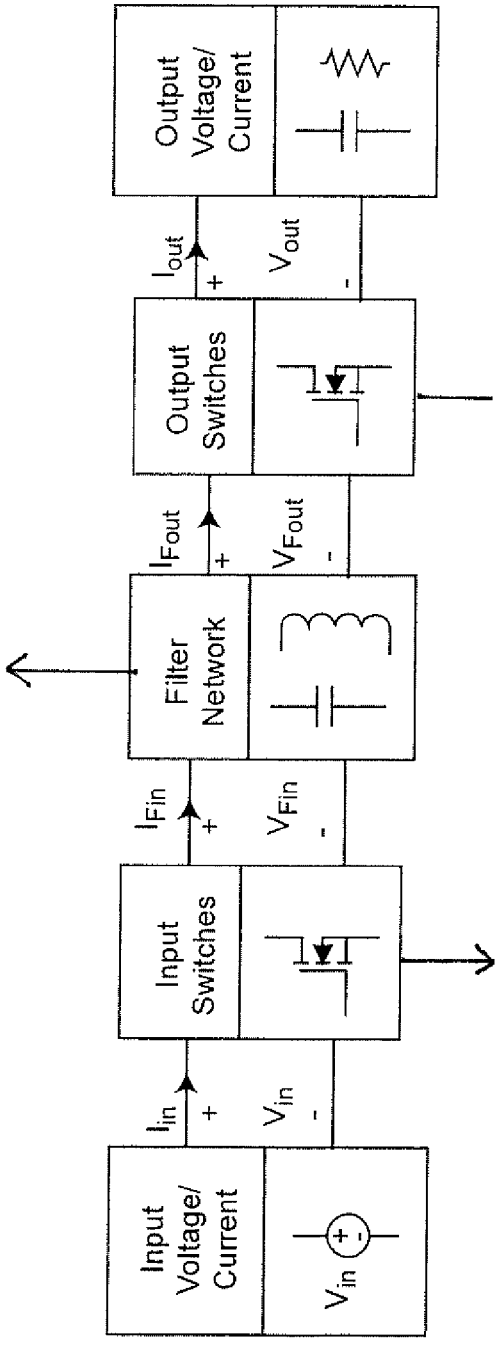
FIG. 17 illustrates the basic methodology employed in power conversion utilizing a null-immittance criterion.

In view of the foregoing, it is seen that a circuit having a DAB topology or other topology in which the null-immittance criterion can be exploited but operated using only synchronized and symmetric PWM switching waveforms to control switching near the resonant frequency of a resonant circuit allows a wide range of input voltages to be accommodated and a wide range of output voltages to be produced in a simple and reliable manner. All that is necessary to exploit the null-immittance criterion is to provide a resonant circuit and to operate it near the resonant frequency such that the impedance and the voltage across it is near zero to bring the voltages and currents at the input and output ports of the resonant circuit to be substantially equal for direct voltage and current conversion as illustrated in FIG. 17. The output voltage can then be coarsely changed by use of a transformer which also provides isolation, and continuous fine adjustment of output voltage over a wide range can be achieved through symmetric and synchronized PWM.

Figure 14:
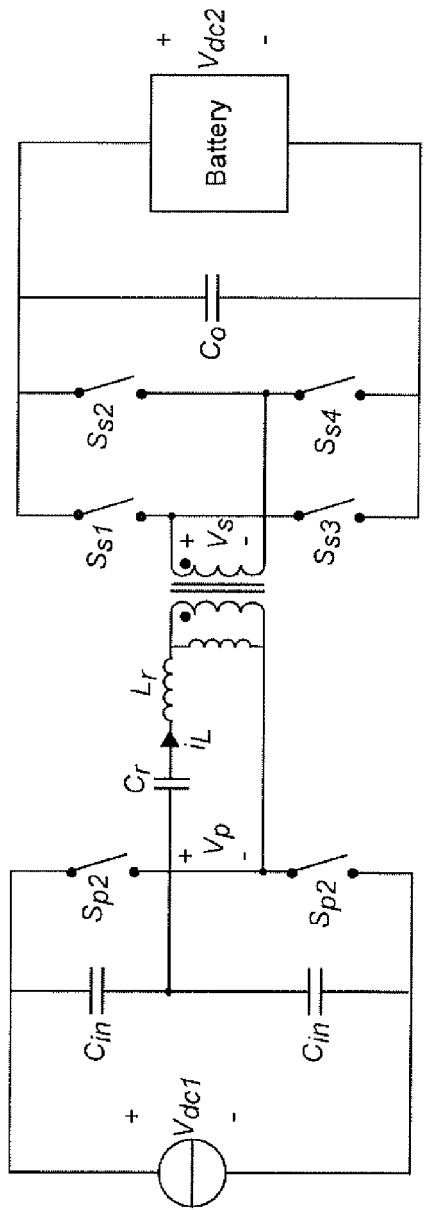
Figure 15:
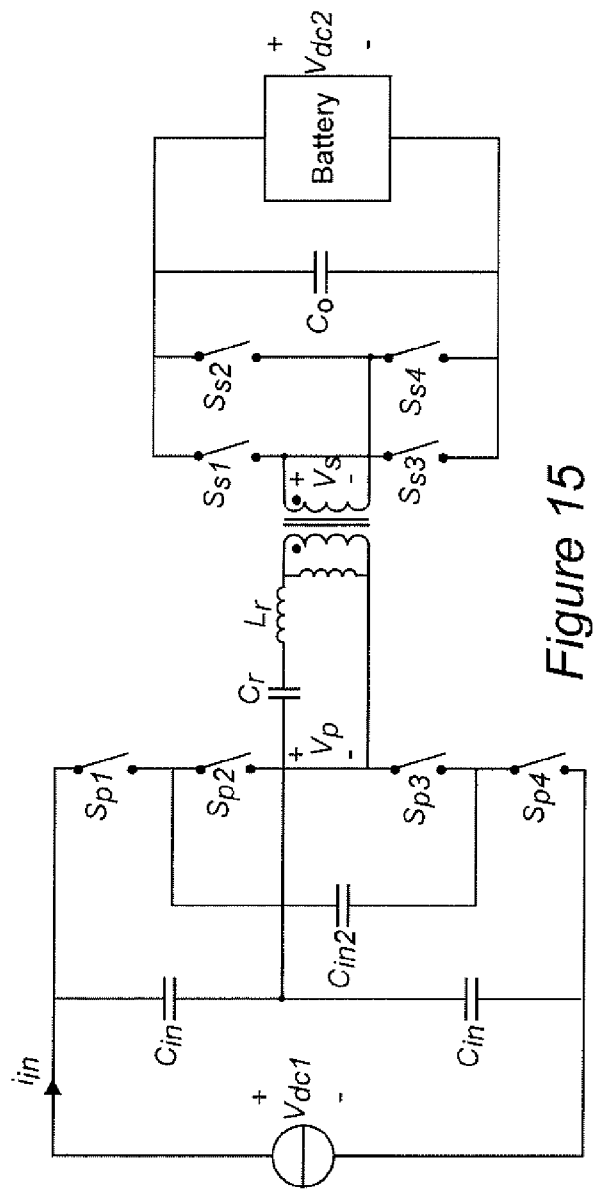
Figure 16:
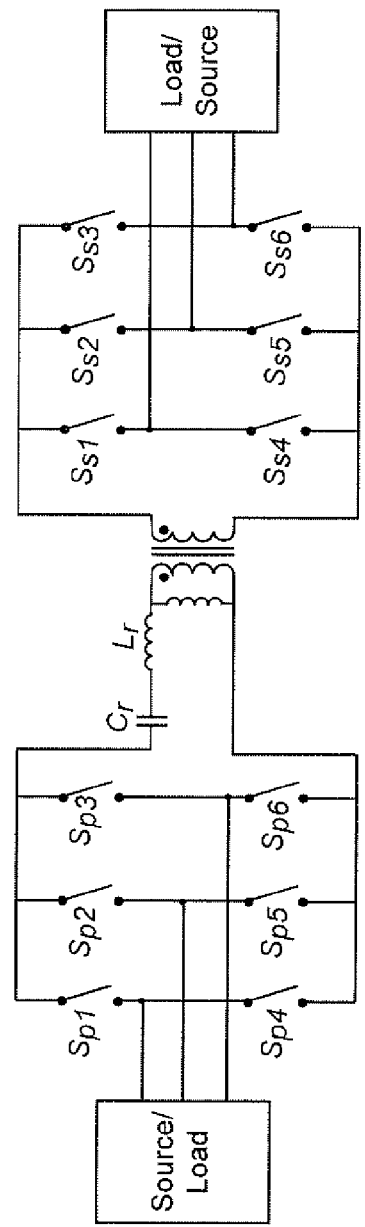

Switching circuits are required only for PWM and conversion between DC and AC at a frequency which satisfies the null-immittance criterion and such switching circuits, such as half and full bridge circuits, can be used to achieve bi-directional power transfer, potentially in a fully symmetric topology; all of which are achieved in the preferred embodiment described above in a manner far more simple than has previously been available. The preferred embodiment described above possesses all properties considered desirable for applications requiring storage of energy that have not, to date, been otherwise achieved. The principles of the invention as described in detail above can be applied to other topologies, as well. For example, the meritorious effects of the invention described above can be similarly achieved using different switching arrangements such as a half bridge at the input side, shown in FIG. 14, a three level voltage converter on the input side as shown in FIG. 15 or a resonant cycloconverter as shown in FIG. 16; in view of which, many other topologies to which the principles of the invention can be advantageously applied will be apparent to those skilled in the art.

While the invention has been described in terms of a single preferred embodiment and variations thereof, those skilled in the art will recognize that the invention can be practiced with modification within the spirit and scope of the appended claims.

Having thus described our invention, what we claim as new and desire to secure by Letters Patent is as follows:

1. A power converter comprising
a first switching circuit having a plurality of switches,
a second switching circuit having a plurality of switches,
a connection between said first switching circuit and said second switching circuit, said connection including a resonant circuit, and
a pulse width modulation circuit for providing driving pulses to drive said plurality of switches of said first switching circuit and said second switching circuit with pulses such that driving pulses of at least one of said first switching circuit and said second switching circuit are pulse width modulated and centers of driving pulses of said first switching circuit and said second switching circuit are synchronized at a substantially fixed frequency near a resonant frequency of said resonant circuit.

2. A power converter as recited in claim 1 wherein said connection further includes a transformer.

3. A power converter as recited in claim 2, wherein a turns ratio of said transformer is 1:1.

4. A power converter as recited in claim 2 wherein said transformer is an isolation transformer.

5. A power converter circuit as recited in claim 2 wherein at least one of said plurality of switches of said second switching circuit is a diode.

6. A power converter as recited in claim 2, wherein said first switching circuit has a topology that is symmetrical to said second switching circuit.

7. A power converter as recited in claim 2, wherein said resonant circuit comprises a series connected inductor and capacitor.

8. A power converter as recited in claim 7 wherein said inductor comprises a leakage inductance of a transformer.

9. A power converter as recited in claim 2, wherein said first switching circuit is a full bridge circuit.

10. A power converter as recited in claim 1 wherein at least one of said plurality of switches of said second switching circuit is a diode.

11. A power converter as recited in claim 1, wherein said first switching circuit has a topology that is symmetrical to said second switching circuit.

12. A power converter as recited in claim 1, wherein said resonant circuit comprises a series connected inductor and capacitor.

13. A power converter as recited in claim 12 wherein said inductor comprises a leakage inductance of a transformer.

14. A power converter as recited in claim 1, wherein said first switching circuit is a full bridge circuit.

15. The power converter as recited in claim 1, wherein said resonant circuit is a series resonant circuit.

16. A method of operating a power converter circuit having first and second switching circuits, each switching circuit comprising a plurality of switches connected to provide conversion between AC and DC voltage, and a resonant circuit, said resonant circuit connecting said first and second switching circuits, said method comprising controlling switches of at least said first switching circuit to provide pulse width modulated current in said resonant circuit at a substantially fixed frequency near a resonant frequency of said resonant circuit such that centers of the duty cycles of respective switches of said second switching circuit are substantially synchronized and substantially symmetrical about centers of said duty cycles of respective switches of said first switching circuit.

17. The method as recited in claim 16, wherein said resonant circuit is a series resonant circuit.

* * * * *